US012668723B2

(12) United States Patent
Liao et al.

(10) Patent No.: US 12,668,723 B2
(45) Date of Patent: Jun. 30, 2026

(54) PRESSURE-SENSITIVE ADHESIVE TAPE SUITABLE FOR COMPONENT CUTTING PROCESS

(71) Applicant: NAN YA PLASTICS CORPORATION, Taipei (TW)

(72) Inventors: Te-Chao Liao, Taipei (TW); Chun-Che Tsao, Taipei (TW); Cheng-Hung Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 637 days.

(21) Appl. No.: 18/169,864

(22) Filed: Feb. 15, 2023

(65) Prior Publication Data

US 2024/0191105 A1 Jun. 13, 2024

(30) Foreign Application Priority Data

Nov. 28, 2022 (TW) ................................ 111145367

(51) Int. Cl.
*C09J 133/08* (2006.01)
*C09J 7/38* (2018.01)

(52) U.S. Cl.
CPC ............ *C09J 7/385* (2018.01); *C09J 133/08* (2013.01); *C09J 2301/302* (2020.08); *C09J 2433/00* (2013.01); *Y10T 428/2809* (2015.01); *Y10T 428/287* (2015.01); *Y10T 428/2891* (2015.01)

(58) Field of Classification Search
None
See application file for complete search history.

(56) References Cited

U.S. PATENT DOCUMENTS

2002/0019454 A1* 2/2002 Kanai .................. C08K 5/5397
522/64
2004/0131839 A1* 7/2004 Eagle ...................... B32B 15/18
428/317.1
2016/0232821 A1* 8/2016 Janko ........................ G09F 3/02

FOREIGN PATENT DOCUMENTS

| | | | |
|---|---|---|---|
| JP | 57155274 | A | 9/1982 |
| JP | 2001181585 | A | 7/2001 |
| JP | 2009242633 | A | 10/2009 |
| JP | 2009292888 | A | 12/2009 |
| JP | 201043184 | A | 2/2010 |
| TW | 202039746 | A | 11/2020 |
| WO | WO2017149925 | A1 | 9/2017 |

OTHER PUBLICATIONS

Machine translation of JP 2009292888A, Dec. 17, 20009 (Year: 2009).*

* cited by examiner

*Primary Examiner* — Anish P Desai
(74) *Attorney, Agent, or Firm* — Li & Cai Intellectual Property Office

(57) ABSTRACT

A pressure-sensitive adhesive tape suitable for component cutting process is provided. The pressure-sensitive adhesive tape includes a release film layer, an adhesive layer, and a support base layer that are stacked in sequence. Based on the adhesive layer having a total weight percent of 100 wt %, the adhesive layer includes 40-50 wt % of an acrylic resin, 40-65 wt % of an epoxy monomer, 0.05-0.5 wt % of a hardener, and 0.5-1.0 wt % of an initiator. The adhesive layer has a first acid value before being exposed to an ultraviolet light, the adhesive layer has a second acid value after being exposed to the ultraviolet light, and the second acid value is smaller than the first acid value.

8 Claims, 4 Drawing Sheets

PRESSURE-SENSITIVE ADHESIVE TAPE SUITABLE FOR COMPONENT CUTTING PROCESS

CROSS-REFERENCE TO RELATED PATENT APPLICATION

This application claims the benefit of priority to Taiwan Patent Application No. 111145367, filed on Nov. 28, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a tape, and more particularly to a pressure-sensitive adhesive tape suitable for component cutting process.

BACKGROUND OF THE DISCLOSURE

In the related art, the pressure-sensitive adhesive tape used in a component cutting process generally has a UV adhesive layer. Most of the UV adhesive layers use only acrylic resin. However, the adhesive strength of the existing pressure-sensitive adhesive tape attached to the cutting substrate is insufficient. After UV exposure, the bonding strength between the pressure-sensitive adhesive tape and the cutting substrate is too high, so that the pressure-sensitive adhesive tape is not easy to be peeled off from the cutting substrate and thus results in adhesive residue. Therefore, the existing pressure-sensitive adhesive tapes are not suitable for various component cutting processes, and the range of application is relatively narrow.

SUMMARY OF THE DISCLOSURE

In response to the above-referenced technical inadequacies, the present disclosure provides a pressure-sensitive adhesive tape suitable for a component cutting process.

In order to resolve the technical problems, one of the technical solutions of the present disclosure provides a pressure-sensitive adhesive tape suitable for component cutting process, including: a release film layer, an adhesive layer and a support base layer. The adhesive layer is formed on a side of the release film layer and includes 40-50 wt % of an acrylic resin, 40-65 wt % of an epoxy monomer, 0.05-0.5 wt % of a hardener, and 0.5-1.0 wt % of an initiator based on the adhesive layer having a total weight percent of 100 wt %. The support base layer is formed on a side surface of the adhesive layer away from the release film layer. The adhesive layer has a first acid value before being exposed to an ultraviolet light, the adhesive layer has a second acid value after being exposed to the ultraviolet light, and the second acid value is smaller than the first acid value.

Preferably, the first acid value of the adhesive layer before being exposed to the ultraviolet light is between 5 mg KOH/g and 20 mg KOH/g, and the second acid value of the adhesive layer after being exposed to the ultraviolet light is between 1 mg KOH/g and 4 mg KOH/g.

Preferably, the first acid value of the adhesive layer before being exposed to the ultraviolet light is between 10 mg KOH/g and 15 mg KOH/g, and the second acid value of the adhesive layer after being exposed to the ultraviolet light is between 1 mg KOH/g and 3 mg KOH/g.

Preferably, the release film layer has a first thickness ranging from 25 microns to 45 microns, the adhesive layer has a second thickness ranging from 3 microns to 30 meters, and the support base layer has a third thickness ranging from 50 micrometers to 180 meters. The release film layer is mainly consisting of a polyester material, and the support base layer is mainly consisting of a polyolefin material.

Preferably, the epoxy monomer in the adhesive layer is a reactive epoxy monomer with the following chemical structure:

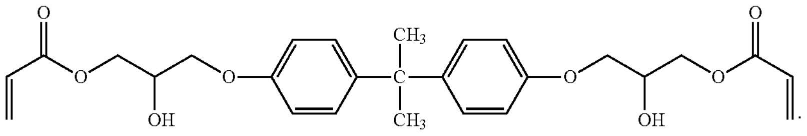

Preferably, the hardener is an isocyanate hardener, and the initiator is a photoinitiator.

Preferably, a wavelength of the ultraviolet light is between 300 nm and 380 nm, and an exposure energy of the ultraviolet light to the adhesive layer is between 100 $mJ/cm^2$ and 300 $mJ/cm^2$.

Preferably, in a component cutting process, the release film layer is configured to be torn off, and the adhesive layer is configured to be attached to a cutting substrate. The cutting substrate is a printed circuit board, a ceramic substrate, a glass substrate, or a wafer. Before the adhesive layer is exposed to the ultraviolet light, a first peeling force between the adhesive layer and the cutting substrate is greater than or equal to 10 N/inch.

Preferably, after the adhesive layer is exposed to the ultraviolet light, the epoxy monomer in the adhesive layer undergoes a crosslinking reaction, and the adhesive layer is formed to be an exposed adhesive layer. A second peeling force between the exposed adhesive layer and the cutting substrate is smaller than or equal to 0.2 N/inch.

Preferably, the adhesive layer shrinks after the epoxy monomer undergoes the crosslinking reaction, so that a contact area between the exposed adhesive layer and the cutting substrate is reduced.

One of the beneficial effects of the present disclosure provides a pressure-sensitive adhesive tape suitable for a component cutting process that can improve the bonding strength between the adhesive layer and the cutting substrate, and avoid adhesive residue after the tape is removed by the technical solution of “the adhesive layer includes 40-50 wt % of an acrylic resin, 40-65 wt % of an epoxy monomer, 0.05-0.5 wt % of a hardener, and 0.5-1.0 wt % of an initiator based on the adhesive layer having a total weight percent of 100 wt %” and “the adhesive layer has a first acid value before being exposed to an ultraviolet light, the adhesive layer has a second acid value after being exposed to the ultraviolet light, and the second acid value is smaller than the first acid value”.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
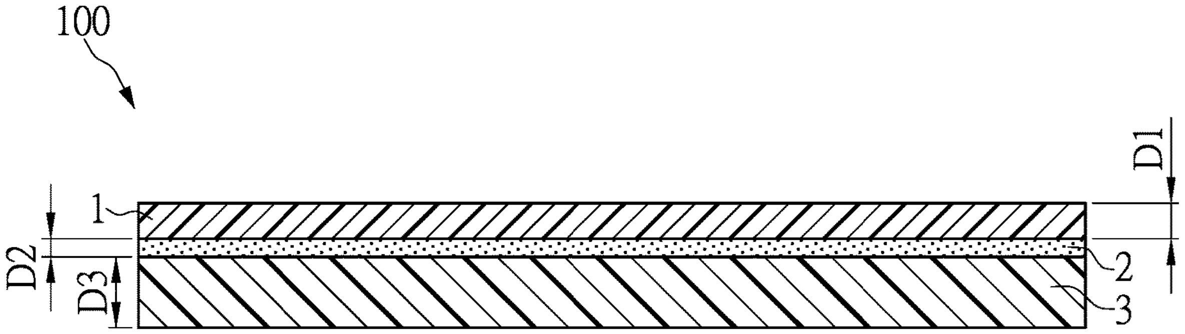
FIG. 1 is schematic view of a pressure-sensitive adhesive tape suitable for component cutting process of an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

[Pressure-Sensitive Adhesive Tape Suitable for Component Cutting Process]

As shown in FIG. 1, the embodiment of the present disclosure provides a pressure-sensitive adhesive tape 100, especially a pressure-sensitive adhesive tape suitable for component cutting process. For example, the pressure-sensitive adhesive tape of the embodiment of the present disclosure is suitable for a semiconductor wafer cutting process or a packaging component cutting process, but the present disclosure is not limited thereto. In addition, in the cutting process, a substrate to be cut to which the pressure-sensitive adhesive tape is attached can be, for example, a printed circuit board, a ceramic substrate, a glass substrate, or a wafer (such as: a substrate used as a carrier in the integrated circuit manufacturing process).

Reference is made to FIG. 1 again. The pressure-sensitive adhesive tape 100 of the embodiment of the present disclosure includes a release film layer 1, an adhesive layer 2, and a support base layer 3 stacked in sequence from top to bottom. From another perspective, the adhesive layer 2 is formed on a side surface of the release film layer 1 (such as a lower surface of the release film layer 1 in FIG. 1). The support base layer 3 is formed on a side surface of the adhesive layer 1 away from the release film layer 1 (such as a lower surface of the adhesive layer 2 in FIG. 1), but the present disclosure is not limited thereto. In practical applications, an installation direction of the pressure-sensitive adhesive tape 100 can be changed according to requirements. For example, the support base layer 3 may be located on an uppermost layer, the release film layer 1 may be located on a lowermost layer, and the adhesive layer 2 may be located between the support base layer 3 and the release film layer 1.

In order to facilitate the understanding of the present disclosure, the material features of each layer in the pressure-sensitive adhesive tape 100 of the embodiment of the present disclosure will be described in detail below, and the connection relationship between each layer will be described in due course.

The release film layer 1 can be separated from the adhesive layer 2 during a component cutting process, so that the adhesive layer 2 can be exposed. In terms of thickness range, a first thickness D1 of the release film layer 1 is between 25 microns to 45 microns, preferably between 28 microns to 40 microns, and particularly between 30 microns to 40 microns, but the present disclosure is not limited thereto. The release film layer 1 can be, for example, a polyester release film layer (for example: a PET release film). In some embodiments of the present disclosure, the polyester release film layer can be coated with a layer of silicone oil on a surface of the polyester film or an inorganic material can be added to the polyester film to reduce a surface adhesion of the polyester film, thereby achieving a release effect.

The adhesive layer 2 can be attached to a back of a substrate to be cut during a component cutting process. Solid components of the adhesive layer 2 include: an acrylic resin, an epoxy monomer, a hardener, and a photoinitiator.

A concentration of the acrylic resin is between 40 wt % to 50 wt %, a concentration of the epoxy monomer is between 40 wt % to 65 wt %, a concentration of the hardener is between 0.05 wt % and 0.5 wt %, and a concentration of the photoinitiator is between 0.5 wt % and 1.0 wt % based on the adhesive layer having a total weight percent of 100 wt %.

The acrylic resin may be, for example, poly(methyl methacrylate), (PMMA), which has a chemical structure of the following formula (I), in which n=3,000~5,000.

formula (I)

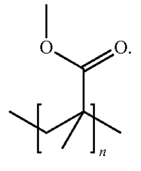

The epoxy monomer is a reactive epoxy monomer, which is used to improve an adhesiveness of the adhesive layer 2, and the epoxy monomer produces a crosslinking reaction after being irradiated by an ultraviolet light, so that the adhesive layer 2 shrinks to reduce the adhesiveness of the adhesive layer 2. The epoxy monomer has a chemical structure of the following formula (II), but the present disclosure is not limited thereto.

In terms of thickness range, a second thickness D2 of the adhesive layer 2 is between 3 micrometers and 30 meters, preferably between 5 meters and 25 meters, and more preferably between 10 micrometers and 20 micrometers, but the present disclosure is not limited thereto.

In some embodiments of the present disclosure, the pressure-sensitive adhesive tape 100 satisfies the following characteristics: (i) A first acid value of the adhesive layer 2 before being exposed to the ultraviolet light is between 5 mg KOH/g and 20 mg KOH/g, and preferably between 10 mg KOH/g and 15 mg KOH/g. (ii) A second acid value of the adhesive layer 2a after being exposed to the ultraviolet light is between 1 mg KOH/g and 4 mg KOH/g, and preferably between 1 mg KOH/g and 3 mg KOH/g. That is to say, a control of the acid value of the adhesive layer 2 before and after being exposed to the ultraviolet light is preferably taken into consideration.

formula (II)

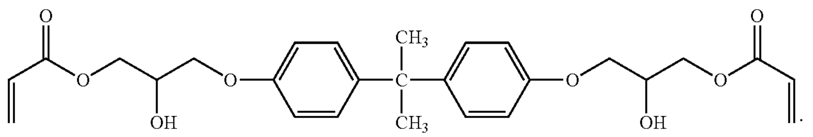

The hardener is used to increase a degree of polymerization of the acrylic resin in the adhesive layer 2 to increase a molecular weight of the acrylic resin. The hardener is an isocyanate hardener. The isocyanate hardener may be, for example, at least one of aliphatic diisocyanate, cycloaliphatic diisocyanate, and aromatic diisocyanate.

In various embodiments of the present disclosure, the aliphatic diisocyanate may be, for example, at least one selected from the group consisting of the following materials: tetramethylene diisocyanate, hexamethylene diisocyanate, decamethylene diisocyanate, methyl diisocyanate, and lysine diisocyanate. The cycloaliphatic diisocyanate may be, for example, at least one selected from the group consisting of isophorone diisocyanate, hydrogenated toluene diisocyanate, hydrogenated xylene diisocyanate, dicyclohexylmethane diisocyanate, and tetramethylxylene diisocyanate.

In addition, the aromatic diisocyanate can be, for example, at least one selected from the group consisting of the following materials: 2,4-toluene diisocyanate, 2,6-toluene diisocyanate, xylene-1,4-diisocyanate, xylene-1,3-diisocyanate, 4,4'-diphenylmethane diisocyanate, 2,4 '-diphenylmethane diisocyanate, 4,4'-diphenyl ether diisocyanate, 2-nitrodiphenyl-4,4'-diisocyanate, 2,2'-diphenylpropane-4, 4'-di isocyanate, 3,3'-dimethyldiphenylmethane-4,4'-diisocyanate, 4,4'-diphenylpropane diisocyanate, m-phenylene diisocyanate, p-phenylene diisocyanate, naphthalene-1,4-aromatic diisocyanate such as diisocyanate, naphthalene-1, 5-diisocyanate, 3,3'-dimethoxydiphenyl-4,4'-diisocyanate, and polyphenylene polymethylene polyisocyanate.

In a specific embodiment of the present disclosure, the isocyanate hardener is hexamethylene diisocyanate (HDI), but the present disclosure is not limited thereto.

The initiator is a photoinitiator, which is used for polymerizing the acrylic monomer in the adhesive layer 2 to form the acrylic resin. In a specific embodiment of the present disclosure, the initiator is (2,4,6-trimethylbenzoyl) diphenyl phosphine oxide (diphenyl(2,4,6-trimethylbenzoyl) phosphine oxide), but the present disclosure is not limited thereto.

A wavelength of the ultraviolet light can be, for example, between 300 nm to 380 nm, preferably between 340 nm to 380 nm, and more preferably between 360 nm to 375 nm, but the present disclosure is not limited thereto. The exposure energy of the ultraviolet light to the adhesive layer can be, for example, between 100 $mJ/cm^2$ and 300 $mJ/cm^2$, preferably between 150 $mJ/cm^2$ and 250 $mJ/cm^2$, and more preferably between 175 $mJ/cm^2$ and 225 $mJ/cm^2$. In addition, an exposure time of the ultraviolet light to the adhesive layer can be, for example, between 0.05 minutes to 5.0 minutes, preferably between 0.10 minutes to 1.0 minutes, and more preferably between 0.15 minutes to 0.5 minutes, but the present disclosure is not limited thereto.

Further, the "acid value" mentioned in the present disclosure refers to a number of milligrams of potassium hydroxide (KOH) required to neutralize one gram of chemical substances. "Acid value" is a measure of a number of free carboxylic acid groups in a compound (such as a fatty acid) or a mixture. The acid value can be measured, for example, by dissolving a portion of a known sample in an organic solvent, titrating the sample with a potassium hydroxide solution of a known concentration, and using a phenolphthalein solution as a color indicator. The embodiment of the present disclosure adopts the ASTM D974 standard for the test method of acid value, but the present disclosure is not limited thereto.

Figure 2A:
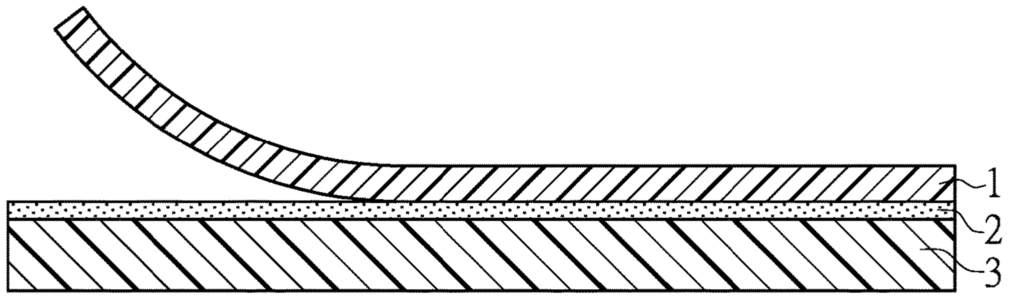
FIG. 2A to FIG. 2F are schematic views of steps S110 to S160 of a use method of a pressure-sensitive adhesive tape suitable for component cutting process of an embodiment of the present disclosure.
Figure 2B:
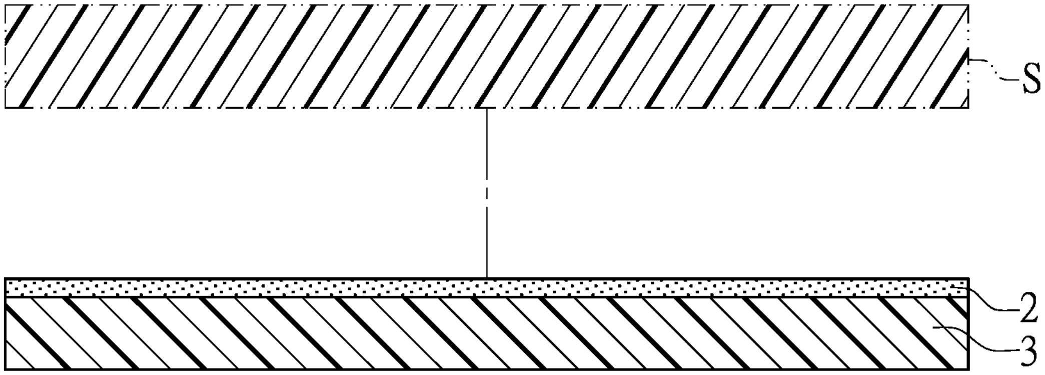
Figure 2C:
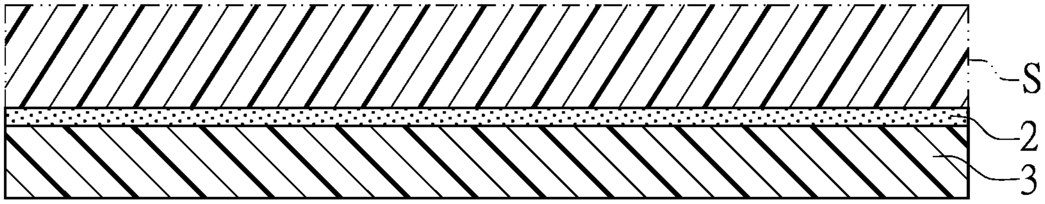

In addition, the adhesive layer 2 is configured to attach to a substrate S to be cut in a component cutting process (as shown in FIG. 2C). Before the adhesive layer 2 is exposed to the ultraviolet light, a first peeling force between the adhesive layer 2 and the substrate S to be cut is not smaller than 10 N/inch. That is to say, the adhesive layer 2 has a high bonding strength with the substrate S to be cut before being exposed to the ultraviolet light.

Figure 2D:
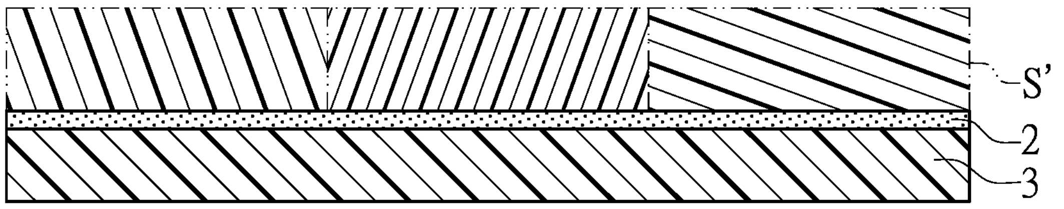
Figure 2E:
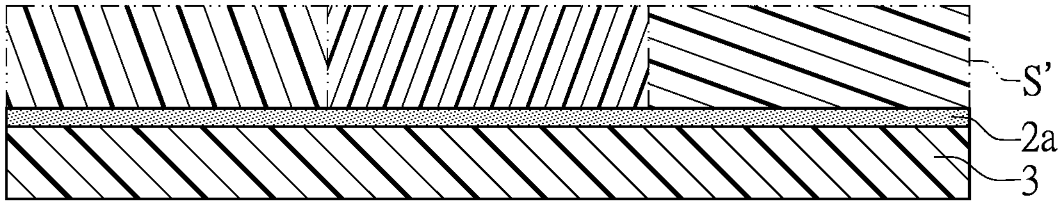

After the adhesive layer 2 is exposed to the ultraviolet light, the epoxy monomer in the adhesive layer 2 undergoes a crosslinking reaction to form an exposed adhesive layer 2a (as shown in FIG. 2E). A second peeling force between the exposed adhesive layer 2a and the cutting substrate S' is not greater than 0.2 N/inch. That is to say, an adhesive strength between the exposed adhesive layer 2a and the cutting substrate S' is greatly reduced after exposure. Therefore, the exposed adhesive layer 2a can be easily peeled off from the cutting substrate S' without having any residual adhesive layer on the cutting substrate.

More specifically, the adhesive layer 2 shrinks after the epoxy monomer undergoes a crosslinking reaction, so that a contact area between the exposed adhesive layer 2a and the cutting substrate S' is reduced. Accordingly, the bonding strength between the exposed adhesive layer 2a and the cutting substrate S' can be greatly reduced.

In various embodiments of the present disclosure, the substrate S to be cut can be, for example, a printed circuit board, a ceramic substrate, a glass substrate, or a wafer. For example, the substrate S to be cut is a glass substrate, but the present disclosure is not limited thereto.

In addition, the test method of the first peeling force and the second peeling force may use, for example, the ASTM D3330 standard.

For example, the test method is performed by rolling the adhesive layer back and forth with a roller once and attaching the adhesive layer on the substrate to be cut, and then the test can be carried out after the adhesive layer stops being rolled with the roller. The substrate is fixed on a lower fixture, the sample is folded at 180 degrees and fixed on an upper fixture, the adhesive layer is peeled off from the substrate at a predetermined speed (such as: 300 mm/min), an average value of the peeling time is measured, and a unit is recorded in N/inch.

On the whole, besides the acrylic resin, the epoxy monomer (reactive monomer) is additionally added to the adhesive layer 2. The epoxy monomer can improve the adhesion of the adhesive layer, and after being exposed to the ultraviolet light, the epoxy monomer can produce a crosslinking and curing reaction, so that the exposed adhesive layer 2a shrinks, and the contact area between the epoxy monomer and the substrate is reduced, thereby reducing the bonding strength between the adhesive layer and the substrate.

Further, the support base layer 3 may be, for example, a polyolefin film (PO film). In terms of thickness range, a third thickness D3 of the support base layer 3 is between 50 micrometers and 180 meters, preferably between 80 meters and 150 meters, and more preferably between 100 micrometers and 150 meters between, but the present disclosure is not limited thereto. The material type of the polyolefin film can be, for example, at least one selected from the group consisting of the following materials: polyethylene (PE), polypropylene (PP), polymethylpentene (PMP), and polybutylene ene-1 (PB-1).

Preferably, the material type of the polyolefin film may be, for example, polypropylene, but the present disclosure is not limited thereto.

[Manufacturing Method of the Pressure-Sensitive Adhesive Tape]

The above embodiment is a description of the material and structural features of the pressure-sensitive adhesive tape, and the following will continue to explain the manufacturing method of the pressure-sensitive adhesive tape according to an embodiment of the present disclosure, which includes S110, S120, and S130. It must be noted that the sequence of the various steps and the actual operation mode described in the embodiment of the present disclosure can be adjusted according to requirements, and are not limited to the embodiment described in the present disclosure. The method for manufacturing a pressure-sensitive adhesive tape according to the embodiment of the present disclosure may provide additional operations before, during, or after each step, and some of the described operations may be replaced, eliminated, or rearranged to achieve additional embodiments of the method.

S110 includes: providing a release film layer 1. The release film layer 1 can be, for example, a polyester release film layer (for example: a PET release film). A first thickness D1 of the release film layer 1 is between 25 microns to 45 microns, preferably between 28 microns to 40 microns, and particularly between 30 microns to 40 microns, but the present disclosure is not limited thereto.

S120 includes: applying an adhesive coating liquid composition to one side surface of the release film layer 1 with an offline coater, and removing a solvent component contained in the adhesive coating liquid composition to form the adhesive layer 2 on the side surface of the release film layer 1. A second thickness D2 of the adhesive layer 2 is between 3 microns to 30 microns, preferably between 5 microns to 25 microns, and more preferably between 10 microns to 40 microns, but the present disclosure is not limited thereto.

The adhesive coating liquid composition may, for example, include a solid component and a solvent component. The solid component includes acrylic resin, epoxy monomer, hardener and photoinitiator. The material characteristics and formulations of the solid component are as described in the above-mentioned embodiments, and will not be repeated here.

The solvent component is used to dilute the solid component, so that the adhesive coating liquid composition has a predetermined viscosity, and it is easier to coat on the release film layer 1 and easy to mold. The solvent component may be, for example, at least one of ethyl acetate (EAC) and methyl ethyl ketone (MEK).

A predetermined viscosity of the adhesive coating liquid composition may be, for example, between 25 cps and 225 cps, and preferably between 50 cps and 200 cps, but the present disclosure is not limited thereto. It should be noted that the predetermined viscosity of the adhesive coating liquid composition in the embodiment is measured at the normal temperature (25° C.). and the normal pressure (1 atm). The viscosity can be tested, for example, by using a rotary viscometer, and the test method can be, for example, the ASTM D2196 standard.

The method of the adhesive coating liquid composition can be, for example, firstly adding an acrylic monomer, a hardener, and a solvent in a container in sequence, and stirring them to form a mixed solution. Then, the photoinitiator and the epoxy monomer are sequentially added.

The adhesive layer 2 is formed after the solvent component in the adhesive coating liquid composition is removed. The adhesive layer 2 is cured because the solvent component has been removed, so there is no viscosity value that can be measured. In the adhesive layer 2, the acrylic monomer will firstly undergo a curing crosslinking reaction (the molecular weight of the acrylic is increased) through the action of the hardener and the photoinitiator, thereby forming the acrylic resin. In addition, the epoxy monomer will not undergo a cross-linking reaction before being exposed to the ultraviolet light, so that the adhesive layer 2 has a high adhesive force and can be better bonded to the substrate to be cut. Further, after the epoxy monomer is exposed to the ultraviolet light, the adhesive layer 2 will shrink and the contact area between the epoxy monomer and the substrate will be decreased, thereby reducing the adhesive force and easily separating the adhesive layer 2 from the substrate.

S130 includes: attaching a support base layer 3 on a side surface of the adhesive layer 2 away from the release film layer 1. A third thickness D3 of the support base layer 3 is between 50 micrometers and 180 meters, preferably between 80 meters and 150 meters, and more preferably between 100 micrometers and 150 meters, but the present disclosure is not limited thereto.

It should be noted that although the present embodiment is described by firstly forming the adhesive layer 2 on the release film layer 1 and then attaching the support base layer 3 to the adhesive layer 2 as an example, but the present disclosure is not limited thereto. For example, the adhesive layer 2 may also be firstly formed on the support base layer 3, and then the release film layer 1 is attached to the adhesive layer 2.

[Usage of the Pressure-Sensitive Adhesive Tape]

The above embodiment is a description of the material characteristics, structural characteristics, and manufacturing method of the pressure-sensitive adhesive tape, and the following will continue to explain the usage method of the pressure-sensitive adhesive tape according to an embodiment of the present disclosure, including S210, S220, S230, S240, S250, S260, and S170. It must be noted that the sequence of the various steps and the actual operation mode described in the embodiment of the present disclosure can be adjusted according to requirements, and are not limited to the examples described in the embodiment. The method for using the pressure-sensitive adhesive tape of the embodiment of the present disclosure may provide additional operations before, during, or after each step, and some of the described operations may be replaced, eliminated, or rearranged to achieve additional embodiments of the method.

As shown in FIG. 2A, S210 includes: providing the pressure-sensitive adhesive tape 100 as described in the above-mentioned embodiment, and a part of the release film layer 1 of the pressure-sensitive adhesive tape 100 is peeled off from the adhesive layer 2, so that the adhesive layer 2 is exposed to the external environment.

As shown in FIG. 2B, S220 includes: providing a substrate S to be cut, and setting the adhesive layer 2 of the pressure-sensitive adhesive tape 100 facing the substrate S to be cut. The substrate S to be cut can be, for example, a printed circuit board, a ceramic substrate, a glass substrate, or a wafer.

As shown in FIG. 2C, S230 includes: attaching the pressure-sensitive adhesive tape 100 to the substrate S to be cut through the adhesive layer 2. The first peeling force between the adhesive layer 2 and the substrate S to be cut is greater than or equal to 10 N/inch, and preferably between 12~15 N/inch.

As shown in FIG. 2D, S240 includes: performing a cutting operation to the substrate S to be cut, so that the substrate S to be cut is cut from the side surface away from the adhesive layer 2 to form a cutting substrate S'. This embodiment is described by cutting the substrate S into three equal parts as an example, but the present disclosure is not limited thereto.

As shown in FIG. 2E, S250 includes: exposing the adhesive layer 2 of the pressure-sensitive adhesive tape 100 to an ultraviolet light, so that the epoxy monomer in the adhesive layer 2 undergoes a cross-linking reaction, and an exposed adhesive layer 2a is formed. A second peeling force between the exposed adhesive layer 2a and the cutting substrate S' is smaller than or equal to 0.2 N/inch, and preferably between 0.05-0.15 N/inch. The adhesive layer 2 shrinks after the epoxy monomer undergoes a crosslinking reaction, so that the contact area between the exposed adhesive layer 2a and the cutting substrate S' is reduced, thereby facilitating the separation of the exposed adhesive layer 2a and the cutting substrate S'.

In some embodiments of the present disclosure, the pressure-sensitive adhesive tape 100 satisfies the following characteristics: (i) A first acid value of the adhesive layer 2 before being exposed to the ultraviolet light is between 5 mg KOH/g to 20 mg KOH/g, and preferably between 10 mg KOH/g and 15 mg KOH/g. (ii) A second acid value of the adhesive layer 2a after being exposed to the ultraviolet light is between 1 mg KOH/g and 4 mg KOH/g, and preferably between 1 mg KOH/g and 3 mg KOH/g. That is to say, the control of the acid value before and after the exposure of the adhesive layer to ultraviolet light is preferably taken into consideration.

Figure 2F:
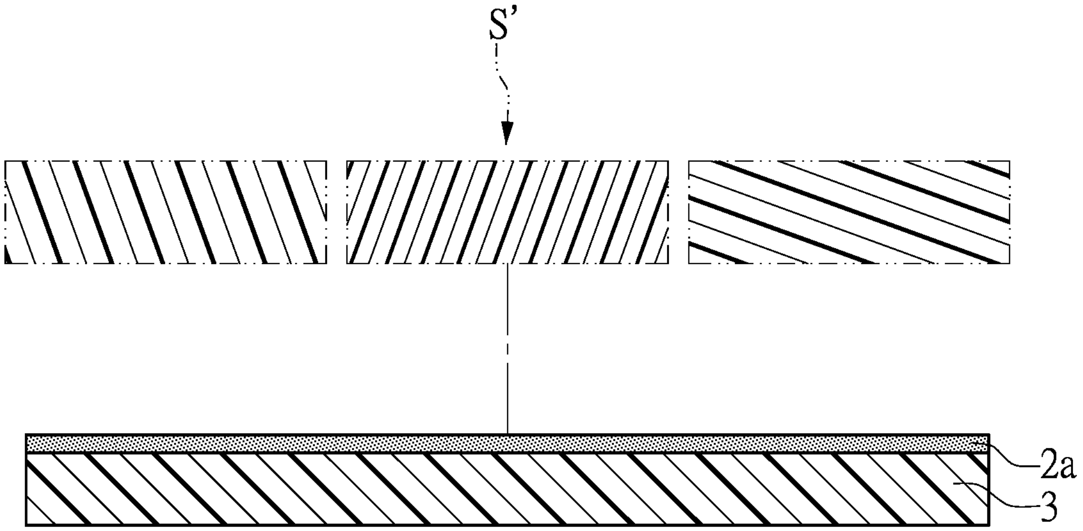

As shown in FIG. 2F, S260 includes: separating the cutting substrate S' from the exposed adhesive layer 2a, so that the cutting substrate S' can be separated into a plurality of small sheet materials.

According to the above-mentioned configuration, the pressure-sensitive adhesive tape 100 provided by the embodiment of the present disclosure can have a high adhesive force (peeling force>=10 N/inch) through the substrate S to be cut and the adhesive layer 2. The adhesive layer 2 can be closely attached to the substrate S to be cut without falling off. During the cutting operation, the adhesive layer 2 will not detach or have adhesive threads.

After being exposed to the ultraviolet light, the adhesive force between the exposed adhesive layer 2a and the cutting substrate S' is greatly reduced (peeling force<=2 N/inch). The exposed adhesive layer 2a can be easily peeled off from the cutting substrate S' without having adhesive residue.

The pressure-sensitive adhesive tape 100 of the embodiment of the present disclosure can be suitable for the cutting process of various components.

[Experimental Data and Test Results]

In order to verify the technical effects of the pressure-sensitive adhesive tape of the embodiment of the present disclosure, experimental data and experimental results will be described below. However, the following examples and comparative examples are only for the convenience of understanding the present disclosure, and the present disclosure is not limited thereto.

<Example 1>: A pressure-sensitive adhesive tape according to the manufacturing method of the above-mentioned pressure-sensitive adhesive tape is prepared, which includes a release film layer, an adhesive layer, and a support base layer, and the adhesive layer is prepared according to the formula in Table 1 below. The adhesive layer includes 40 wt % of an acrylic resin, 59 wt % of an epoxy monomer, 0.2 wt % of an isocyanate hardener, and 0.8 wt % of a photoinitiator based on the adhesive layer having a total weight percent of 100 wt %. A viscosity of the adhesive layer formed on the release film layer is about 150 cps, and a thickness of the adhesive layer is 20 microns. The release film layer of Example 1 is a PET release film, and the support base layer is a polyolefin film.

<Example 2>: The present example is substantially the same as Example 1, and the difference lies in the composition or thickness of the adhesive layer. The adhesive layer includes 40 wt % of an acrylic resin, 59.1 wt % of an epoxy monomer, 0.1 wt % of an isocyanate hardener, and 0.8 wt % of a photoinitiator based on the adhesive layer having a total weight percent of 100 wt %. The coating viscosity of the adhesive layer is about 153 cps, and the thickness of the adhesive layer is 10 microns.

<Example 3>: The present example is substantially the same as Example 1, and the difference lies in the composition or thickness of the adhesive layer. The adhesive layer includes 40 wt % of an acrylic resin, 59.1 wt % of an epoxy monomer, 0.1 wt % of an isocyanate hardener, and 0.8 wt % of a photoinitiator based on the adhesive layer having a total weight percent of 100 wt %. The coating viscosity of the adhesive layer is about 153 cps, and the thickness of the adhesive layer is 10 microns.

<Example 4>: The present example is substantially the same as Example 1, and the difference lies in the composition or thickness of the adhesive layer. The adhesive layer includes 45 wt % of an acrylic resin, 54 wt % of an epoxy monomer, 0.2 wt % of an isocyanate hardener, and 0.8 wt % of a photoinitiator based on the adhesive layer having a total weight percent of 100 wt %. The coating viscosity of the adhesive layer is about 121 cps, and the thickness of the adhesive layer is 20 microns.

<Example 5>: The present example is substantially the same as Example 1, and the difference lies in the composition or thickness of the adhesive layer. The adhesive layer includes 50 wt % of an acrylic resin, 49 wt % of an epoxy monomer, 0.2 wt % of an isocyanate hardener, and 0.8 wt % of a photoinitiator based on the adhesive layer having a total weight percent of 100 wt %. The coating viscosity of the adhesive layer is about 106 cps, and the thickness of the adhesive layer is 20 microns.

<Comparative example 1>: The present example is substantially the same as Example 1, and the difference lies in the composition of the adhesive layer. The adhesive layer includes 20 wt % of an acrylic resin, 0.1 wt % of an isocyanate hardener, 0.8 wt % of a photoinitiator, and 79.1 wt % of an epoxy monomer based on the adhesive layer having a total weight percent of 100 wt %. The coating viscosity of the adhesive layer is about 485 cps, and the thickness of the adhesive layer is 20 microns. A content of the acrylic in Comparative Example 1 is low (20 wt %), and a content of epoxy monomer is high (79.1 wt %).

<Comparative example 2>: The present example is substantially the same as Example 1, and the difference lies in the composition of the adhesive layer. The adhesive layer includes 80 wt % of an acrylic resin, 0.4 wt % of an isocyanate hardener, 0.8 wt % of a photoinitiator, and 18.8 wt % of an epoxy monomer based on the adhesive layer having a total weight percent of 100 wt %. The coating viscosity of the adhesive layer is about 86 cps, and the thickness of the adhesive layer is 20 microns. A content of acrylic in Comparative Example 2 is low (80 wt %) and a content of epoxy monomer is high (18.8 wt %).

<Comparative example 3>: The present example is substantially the same as Example 1, and the difference lies in the composition of the adhesive layer. The adhesive layer includes 98.7 wt % of an acrylic resin, 0.5 wt % of an isocyanate hardener, and 0.8 wt % of a photoinitiator based on the adhesive layer having a total weight percent of 100 wt %. The coating viscosity of the adhesive layer is about 56 cps, and the thickness of the adhesive layer is 20 microns. Almost all acrylics (98.7 wt %) are used and no epoxy monomer is used in Comparative Example 3.

In order to prove the technical effect of the embodiment of the present disclosure, after the release film layer of the pressure-sensitive adhesive tape prepared in any one of Examples 1-5 and Comparative Examples 1-3 is peeled off, the adhesive layer is attached on a substrate to be cut (such as a glass substrate), and the physical and chemical properties of the adhesive layer is tested before and after being exposed to the ultraviolet light, such as acid value and peeling force.

<Acid value>: A portion of a known sample is dissolved in an organic solvent and titrated with a potassium hydroxide solution of known concentration, and a phenolphthalein solution is used as a color indicator. The embodiment of the present disclosure adopts ASTM D974 for the test method of acid value. The first acid value refers to the acid value of the adhesive layer before being exposed to the ultraviolet light, and the second acid value refers to the acid value of the adhesive layer after being exposed to the ultraviolet light.

<Peeling force>: The adhesive layer is rolled back and forth with a roller once and adhered to the substrate to be cut, and the test is carried out after the roller stands. The substrate is fixed on the lower fixture, and the sample is folded at 180° and fixed on the upper fixture. The adhesive layer is peeled off from the substrate at a predetermined speed (such as: 300 mm/min), an average value of the peeling time is measured, and a unit is recorded in N/inch. The first peeling force refers to the peeling force between the adhesive layer and the substrate before the adhesive layer is exposed to the ultraviolet light, and the second peeling force refers to the peeling force between the adhesive layer and the substrate after the adhesive layer is exposed to the ultraviolet light.

TABLE 1

| Items | Example 1 | Example 2 | Example 3 | Example 4 | Example 5 | Comparative Example 1 | Comparative Example 2 | Comparative Example 3 |
|---|---|---|---|---|---|---|---|---|
| Adhesive layer | | | | | | | | |
| Acrylic (wt %) | 40.0 | 40.0 | 40.0 | 45.0 | 50.0 | 20.0 | 80.0 | 98.7 |
| Hardener (wt %) | 0.2 | 0.1 | 0.1 | 0.2 | 0.2 | 0.1 | 0.4 | 0.5 |
| Photoinitiator (wt %) | 0.8 | 0.8 | 0.8 | 0.8 | 0.8 | 0.8 | 0.8 | 0.8 |
| Epoxy monomer (wt %) | 59.0 | 59.1 | 59.1 | 54.0 | 49.0 | 79.1 | 18.8 | 0 |
| Coating viscosity (cp) | 150 | 153 | 153 | 121 | 106 | 485 | 86 | 56 |
| Coating thickness (um) | 20 | 20 | 10 | 20 | 20 | 20 | 20 | 20 |
| Test items | | | | | | | | |
| First acid value (mg KOH/g) | 11.6 | 14.2 | 13.9 | 13.5 | 14.8 | 4.5 | 21.3 | 28.5 |
| First peeling force (N/inch) | 15 | 18 | 10 | 13 | 11 | 20 | 8.3 | 4.6 |
| Sccond acid value (mg KOH/g) | 2.6 | 1.9 | 2.4 | 2.1 | 2.6 | 0.4 | 8.9 | 11.2 |

TABLE 1-continued

| Items | Example 1 | Example 2 | Example 3 | Example 4 | Example 5 | Comparative Example 1 | Comparative Example 2 | Comparative Example 3 |
|---|---|---|---|---|---|---|---|---|
| Second peeling force (N/inch) | 0.15 | 0.21 | 0.08 | 0.17 | 0.16 | 0.08 | 0.45 | 0.60 |
| Adhesive residue | None | None | None | None | None | None | Adhesive residue | Adhesive residue |

[Results]

According to the experimental results, it can be known that the pressure-sensitive adhesive tapes prepared in Examples 1-5 can have high adhesion to the substrate through the adhesive layer (first peeling force>=10 N/inch), and the adhesive layer can be closely attached to the substrate without peeling off. When cutting, the adhesive layer will not be detached or have adhesive threads. After being exposed to the ultraviolet light, the adhesive force between the exposed adhesive layer and the substrate is greatly reduced (second peeling force<=0.5 N/inch). The exposed adhesive layer can be easily peeled off from the substrate without leaving any adhesive residue.

Only a small amount or no epoxy monomer is used in the adhesive layers of Comparative Examples 2-3. The adhesive layers of Comparative Examples 2-3 have obvious adhesive residues after peeling off of the substrate. The adhesive layer of Comparative Example 1 uses a large amount of epoxy monomer. Although the performance of Comparative Example 1 in terms of peeling force and adhesive residue is similar to that of Examples 1-5, the viscosity of the adhesive layer of Comparative Example 1 is high during coating and molding, and the moldability is relatively poor.

More specifically, the viscosity of the adhesive layer in Comparative Example 1 is high, and the thickness of the adhesive layer is difficult to be controlled during coating, resulting in poor thickness uniformity and poor formability.

Based on the above reasons, when downstream customers use the adhesive layer to attach packaging components or wafers, the adhesive layer and packaging components or wafers cannot be tightly bonded, causing problems such as water seepage and pollution during cutting.

Beneficial Effects of the Embodiment

The pressure-sensitive adhesive tape suitable for component cutting process provided by the present disclosure can improve the bonding strength between the adhesive layer and the cutting substrate, and avoid adhesive residue after the tape is removed by the technical solution of "the adhesive layer includes 40-50 wt % of an acrylic resin, 40-65 wt % of an epoxy monomer, 0.05-0.5 wt % of a hardener, and 0.5-1.0 wt % of an initiator based on the adhesive layer having a total weight percent of 100 wt %" and "the adhesive layer has a first acid value before being exposed to a ultraviolet light, the adhesive layer has a second acid value after being exposed to the ultraviolet light, and the second acid value is smaller than the first acid value".

Compared with the UV adhesive layer in the related art, which only uses a single resin, the controllability of the bonding strength of the UV adhesive layer is low, and the adhesive tape is prone to adhesive residue when peeled off, so that the customer's needs for various component cutting processes cannot be met. In particular, the present disclosure improves the UV adhesive layer, introduces reactive monomers into the UV adhesive layer, and develops a better formula, so that the bonding strength of the attached substrate can be improved and adhesive residue can be avoided.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pressure-sensitive adhesive tape, including:

a release film layer;

an adhesive layer formed on a surface of the release film layer, wherein the adhesive layer includes 40-50 wt % of an acrylic resin, 40-65 wt % of an epoxy monomer, 0.05-0.5 wt % of a hardener, and 0.5-1.0 wt % of an initiator based on the adhesive layer having a total weight percent of 100 wt %; and wherein the acrylic resin has a chemical structure of the following formula (I),

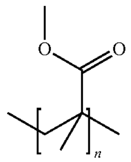

formula (I); wherein n=3,000 to 5,000; and a support base layer formed on a surface of the adhesive layer opposite to the release film layer;

wherein the adhesive layer has a first acid value before being exposed to a ultraviolet light, the adhesive layer has a second acid value after being exposed to the ultraviolet light, and the second acid value is smaller than the first acid value:

wherein the first acid value is between 5 mg KOH/g and 20 mg KOH/g, and the second acid value is between 1 mg KOH/g and 4 mg KOH/g;

wherein a wavelength of the ultraviolet light is between 300 nm and 380 nm, an exposure energy of the ultraviolet light to the adhesive layer is between 100 $mJ/cm^2$ and 300 $mJ/cm^2$, and an exposure time of the ultraviolet light to the adhesive layer is between 0.05 minutes to 5.0 minutes.

2. The pressure-sensitive adhesive tape according to claim 1, wherein the first acid value of the adhesive layer before being exposed to the ultraviolet light is between 10 mg KOH/g and 15 mg KOH/g, and the second acid value of the adhesive layer after being exposed to the ultraviolet light is between 1 mg KOH/g and 3 mg KOH/g.

3. The pressure-sensitive adhesive tape according to claim 1, wherein the release film layer has a first thickness ranging from 25 microns to 45 microns; wherein the release film layer is consisting of a polyester material, and the support base layer is consisting of a polyolefin material.

4. The pressure-sensitive adhesive tape according to claim 1, wherein the epoxy monomer in the adhesive layer is a reactive epoxy monomer with the following chemical structure:

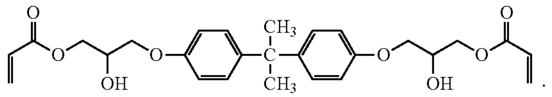 [SMILES: C=CC(=O)OCC(O)COc1ccc(C(C)(C)c2ccc(OCC(O)COC(=O)C=C)cc2)cc1]

5. The pressure-sensitive adhesive tape according to claim 1, wherein the hardener is an isocyanate hardener, and the initiator is a photoinitiator.

6. The pressure-sensitive adhesive tape according to claim 1, wherein in a component cutting process, the release film layer is configured to be torn off, and the adhesive layer is configured to be attached to a cutting substrate; wherein the cutting substrate is a printed circuit board, a ceramic substrate, a glass substrate, or a wafer; wherein, before the adhesive layer is exposed to the ultraviolet light, a first peeling force between the adhesive layer and the cutting substrate is greater than or equal to 10 N/inch.

7. The pressure-sensitive adhesive tape according to claim 6, wherein after the adhesive layer is exposed to the ultraviolet light, the epoxy monomer in the adhesive layer undergoes a crosslinking reaction, and the adhesive layer is formed to be an exposed adhesive layer; wherein a second peeling force between the exposed adhesive layer and the cutting substrate is smaller than or equal to 0.2 N/inch.

8. The pressure-sensitive adhesive tape according to claim 7, wherein the adhesive layer shrinks after the epoxy monomer undergoes the crosslinking reaction, so that a contact area between the exposed adhesive layer and the cutting substrate is reduced.

* * * * *